INVENTOR
JOHN S. MYLES
BY- Smart & Biggar
ATTORNEYS

INVENTOR
JOHN S MYLES
BY- Smart & Biggar.
ATTORNEYS

INVENTOR
JOHN S. MYLES
BY– Smart & Biggar.
ATTORNEYS.

INVENTOR
JOHN S. MYLES
BY– Smart & Biggar.
ATTORNEYS.

INVENTOR
JOHN S. MYLES
BY– Smart & Biggar
ATTORNEYS.

INVENTOR
JOHN S. MYLES
BY- Smart & Biggar.
ATTORNEYS

INVENTOR
JOHN S. MYLES
BY– Smart & Biggar
ATTORNEYS.

United States Patent Office 3,112,364
Patented Nov. 26, 1963

3,112,364

TELEVISION APPARATUS FOR LOCKING THE PHASE OF VERTICAL SYNCHRONIZING PULSES

John S. Myles, Kingsmere, Old Chelsea, Quebec, Canada, assignor to Northern Electric Company Limited, Montreal, Quebec, Canada Filed Dec. 26, 1961, Ser. No. 162,064
11 Claims. (Cl. 178—69.5)

This invention relates to television apparatus for locking the phase of vertical synchronizing pulses and is adapted for use at a local television station which includes a synchronizing pulse generator.

When it is desired to broadcast a network television program locally, local television stations or studios are often connected into the network. The television program material is usually transmitted together with synchronizing pulses from a remote television station in the network to the local television station. When a local television station is connected into such a network, it becomes necessary at frequent intervals to interrupt the network program for local station identification or to insert advertising material at the local station. For this purpose it is necessary to use video equipment including a camera and a synchronizing pulse generator at the local station. It is obviously important that during the intervals the synchronizing pulse generator at the local station must be kept in synchronism with the synchronizing pulses received from the remote station. In particular, the horizontal synchronizing pulses of the local generator must be locked in frequency and phase with the remote horizontal synchronizing pulses and the vertical synchronizing pulses of the local generator must be locked in phase with the remote vertical synchronizing pulses. Since the vertical synchronizing pulses are derived from the horizontal synchronizing pulses in a synchronizing pulse generator, the frequency of the vertical synchronizing pulses is automatically synchronized to that of the remote vertical synchronizing pulses.

The present invention is concerned with providing apparatus for locking the vertical synchronizing pulses generated at the local station into phase with a source of vertical synchronizing pulses generated at a remote station. If the local vertical synchronizing pulses were not locked into phase with the remote vertical synchronizing pulses, a vertical roll of the picture would occur in every television receiver tuned to the local transmitter each time the local transmitter was switched to and from the remote television station of the network.

Prior to this invention, it was well known to accomplish phase locking by comparing the phase difference between the local vertical synchronizing pulses and the remote vertical synchronizing pulses and by various signal processing means, to produce lead or lag gate pulses which were used to effect the phase correction. Many of these prior art devices were adapted to effect the phase correction at a constant rate. This created no difficulties as long as the phase difference between the two sets of pulses was large. However, as the phase correction continued until the phase difference was small, the constant rate of phase correction often caused an overshoot which prevented bringing the phase into lock, thereby greatly reducing the reliability of the phase locking action.

Most modern synchronizing pulse generators include a frequency divider chain fed from a master oscillator for counting down by scale-of-two-electronic stages from the master oscillator frequency to the frequency of the vertical period. The pulses thus formed at the frequency of the vertical period are used to control the occurrence rate of generated vertical synchronizing pulses which are then mixed with horizontal synchronizing pulses and equalizing pulses to form the composite synchronizing pulse signal of the synchronizing pulse generator.

Applicant has discovered that by effecting the phase correction at a variable rate, the possibility of an overshoot occurring can be prevented, thereby providing a reliable phase locking action. According to the present invention, apparatus is provided whereby a series of pulses are derived which when applied to the input of the frequency divider chain during each vertical period, can be adapted to alter the time of operation of the frequency divider chain at a variable rate until the local vertical synchronizing pulses have been locked into phase with a source of remote vertical synchronizing pulses.

The variable rate of phase locking is advantageously achieved by utilizing pulses of a predetermined frequency derived from one of the intermediate stages of the frequency divider chain. The phase difference between the local vertical synchronizing pulses and a source of remote vertical synchronizing pulses is first detected and a pulse signal is formed of which the width of each pulse represents the phase difference between the vertical synchronizing pulses. This pulse signal is used to gate the pulses of the predetermined frequency so that the number of pulses at this frequency that pass through the gate is directly proportional to the phase difference. Thus, the number of pulses applied to the input of the frequency divider chain in each vertical period varies with the amount of phase difference. Pulse generating means are provided to ensure that at least one pulse of the predetermined frequency is applied to the input of the frequency divider chain in a given vertical period as long as a phase difference occurs. When the phase difference is less than one cycle of a pulse occurring at the predetermined frequency the provision of the pulse generating means ensures that one pulse of the predetermined frequency is applied to the input of the frequency divider chain.

Thus, it can be seen that according to the present invention, when the phase difference between the two sets of vertical synchronizing pulses is large, the phase can be advantageously pulled in very quickly. Similarly, when the phase difference is small, the phase can be pulled in more gradually to prevent an overshoot and to ensure a complete phase lock.

When the local vertical synchronizing pulses lag the remote vertical synchronizing pulses in phase, the pulses applied to the input of the frequency divider chain are adapted to be of the same polarity as the trigger pulses derived from the local master oscillator. These pulses which advance the phase of the local vertical synchronizing pulses are applied during the interval between the triggering pulses, thereby speeding up the time of operation of the frequency divider chain.

When the local vertical synchronizing pulses lead the remote vertical synchronizing pulses in phase, the pulses applied to the input of the frequency divider chain are adapted to be of the opposite polarity to the trigger pulses derived from the local master oscillator. These pulses which retard the phase of the local vertical synchronizing pulses are applied so that each pulse cancels out one or more of the triggering pulses, thereby slowing down the time of operation of the frequency divider chain. As can be readily understood, because each pulse applied to the input of the frequency divider chain can be varied in width to cancel out one or more triggering pulses, the invention provides additional advantageous means of varying the speed of the phase locking action.

According to the invention, additional circuitry is provided for automatically selecting the lead or lag function of the phase locking apparatus. It is to be understood that this circuitry is only required when both the lead and lag functions are to be incorporated into a single apparatus. There are useful applications of this invention when only a lead or a lag function would be required.

In order to have a smooth determined phase lock, the input of each individual frequency divider circuit of the frequency divider chain must be in its quiescent state at the time of application of the advancing or retarding pulses to the input of the frequency divider chain. This is true either for conventional parallel fed type of frequency divider chains or for conventional cascade type frequency divider chains. The pulses of predetermined frequency are advantageously utilized for this purpose since the inputs of all the frequency divider circuits are in their quiescent state at the end of each cycle of the pulses of the predetermined frequency. Thus, if the pulses applied to the input of the frequency divider chain have their leading edges coinciding with the trailing edges of the pulses of the predetermined frequency, then a smooth determined phase lock can be achieved.

Once the phase locking has been completed, means are provided by the invention to prevent spurious signals which may accompany the remote vertical synchronizing pulses from starting an erroneous phase locking cycle.

An embodiment of the invention will now be described, by way of example, with reference to the accompanying drawings in which.

Figure 1:
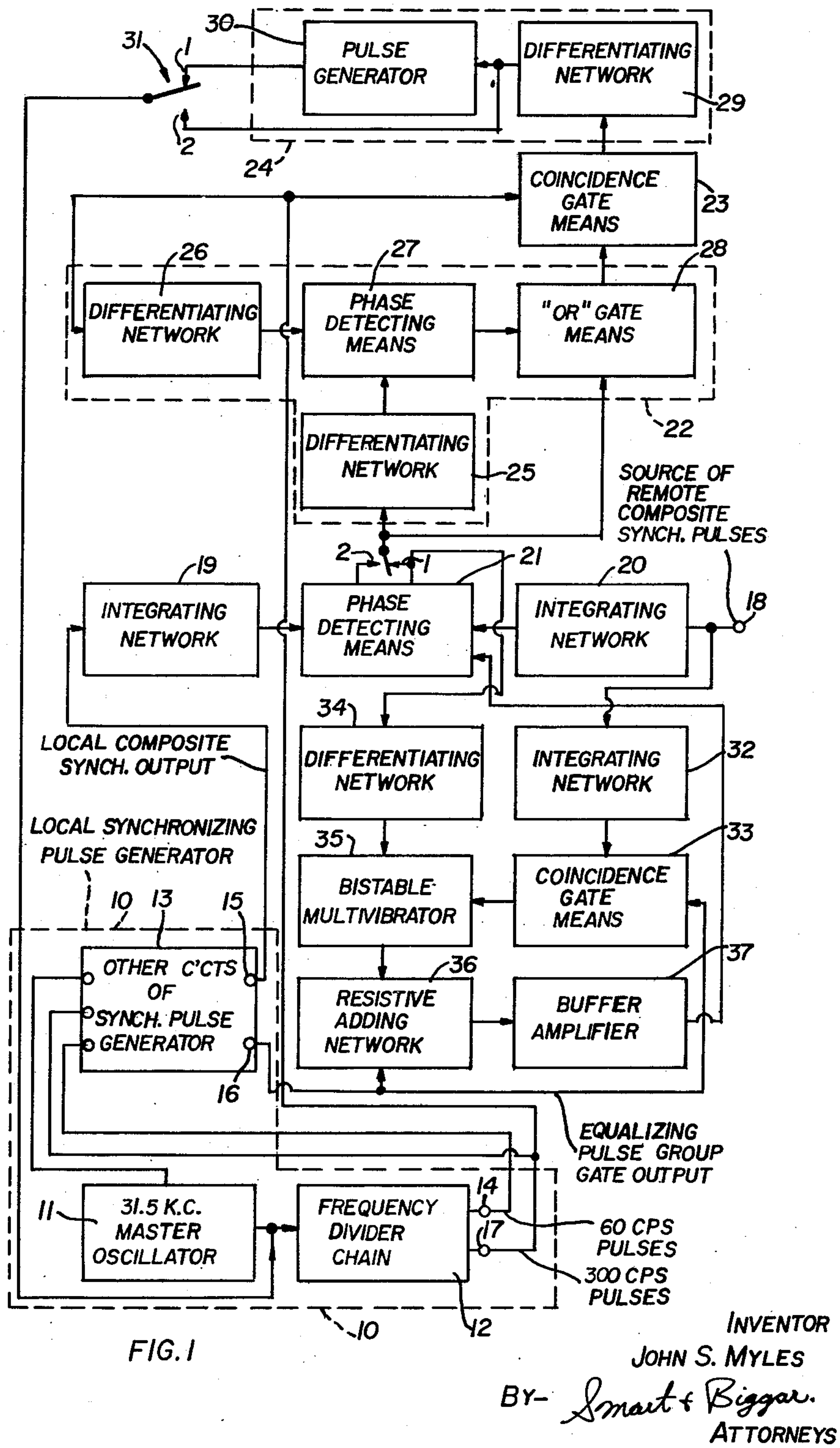
FIGURE 1 is a block diagram illustrating the invention.
Figure 2:
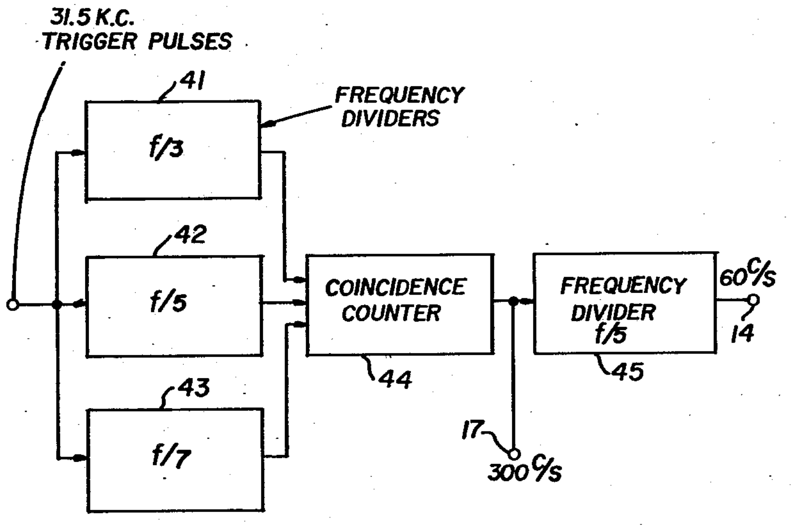
FIGURE 2 is a block diagram of one type of frequency divider chain with which the invention of FIGURE 1 can be advantageously used.
Figure 3:
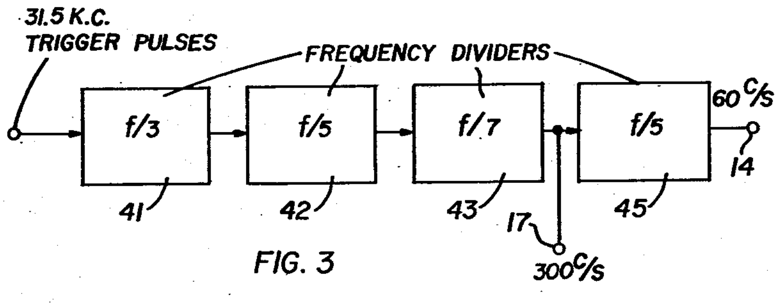
FIGURE 3 is a block diagram of another type of frequency divider chain with which the invention of FIGURE 1 can be advantageously used.
Figure 4A:
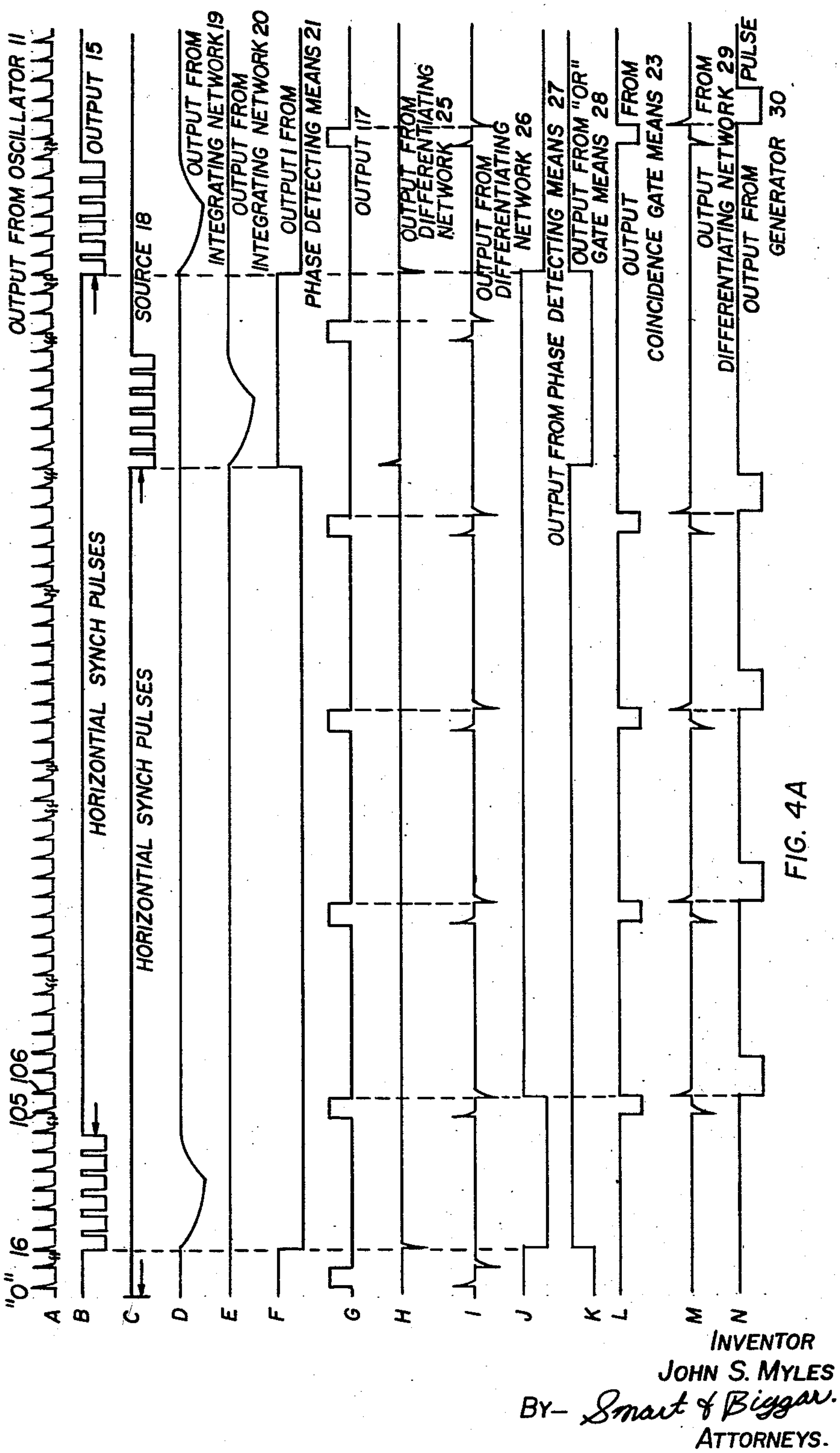
Figure 4B:
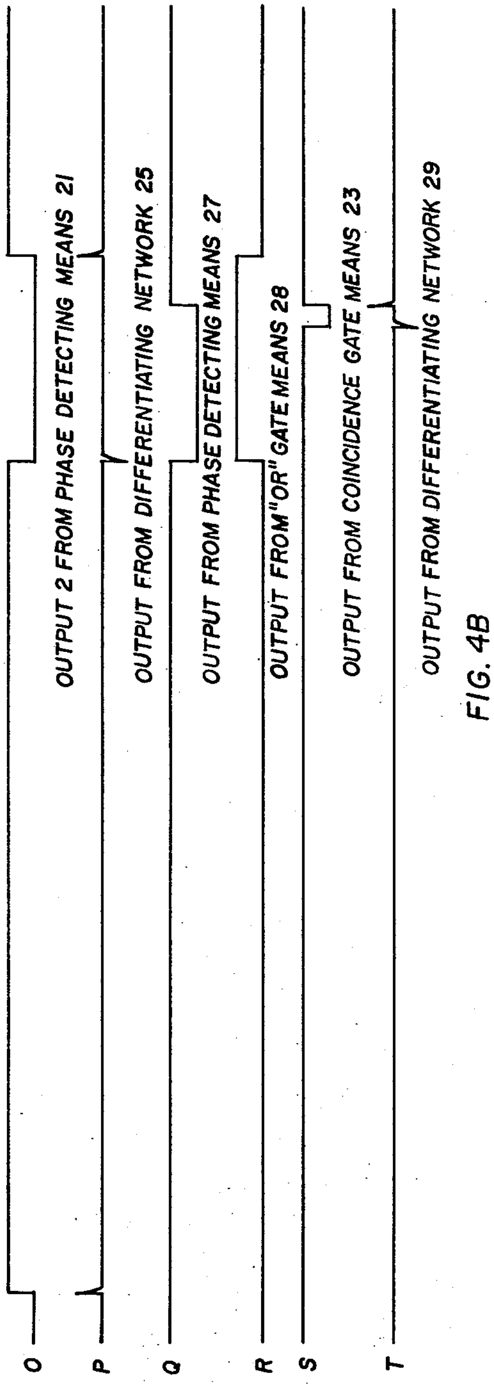
Figure 6:
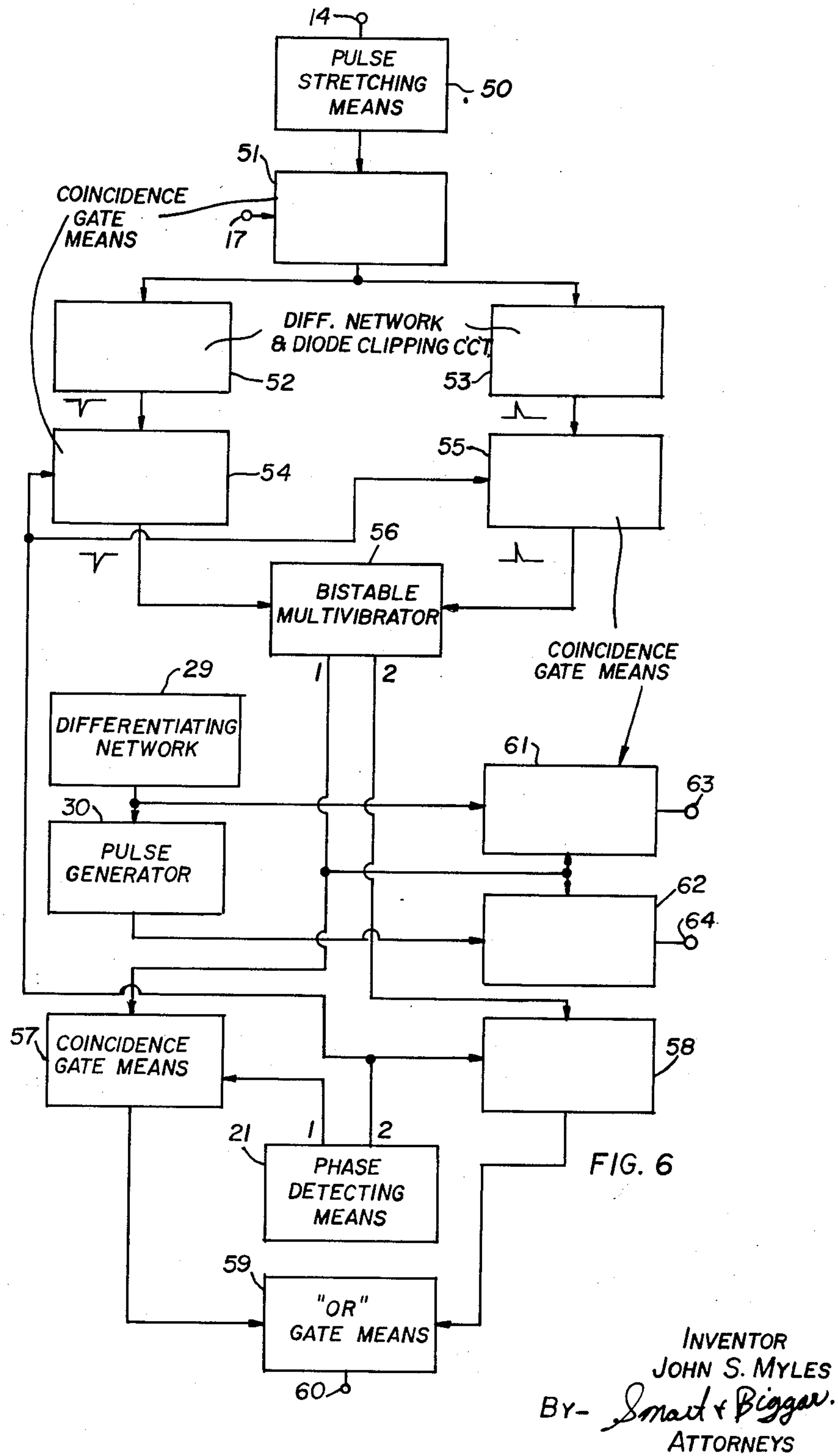
Figure 7:
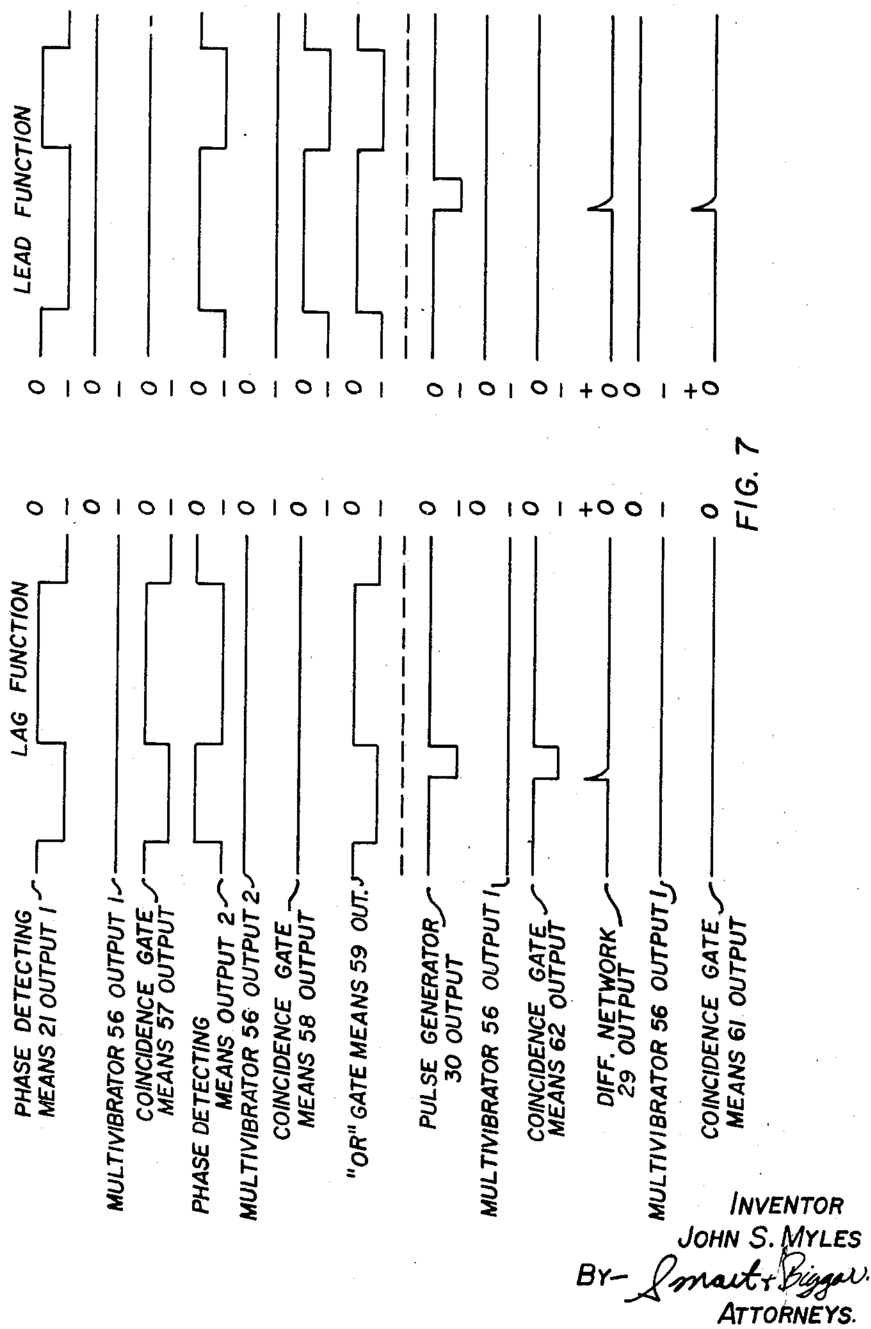

FIGURES 4(*a*), 4(*b*) and 5 are typical waveforms useful for explaining the operation of the invention illustrated in FIGURES 1 to 3;

FIGURE 6 is a block diagram illustrating the circuitry for automatically selecting the lead or lag function of the apparatus; and FIGURE 7 are typical waveforms illustrating the operation of part of FIGURE 6.

Referring to FIGURE 1, there is shown enclosed in dotted rectangle 10 enough of a local synchronizing pulse generator of conventional design to afford a complete understanding of the invention. Trigger pulses are derived from a 31.5 kc. master oscillator 11 and fed to the input of a conventional frequency divider chain 12 and to other circuits of the synchronizing pulse generator shown generally as block 13. The output 14 from the frequency divider chain 12 comprises a series of 60 c.p.s. pulses (the rate of the vertical period). An output derived from an intermediate stage of the frequency divider chain 12 is shown at 17 for a source of pulses of the predetermined frequency (300 c.p.s.). The 60 c.p.s. pulses appearing at output 14 are used to gate the 300 c.p.s. as will be explained more fully hereinafter with reference to FIGURES 2 and 3. The circuits included in block 13 include the conventional vertical synchronizing, horizontal synchronizing, equalizing, blanking, etc. pulse formers, gate and timing pulse formers, mixers and pulse selectors, and various output stages for producing the usual output signals generated in a synchronizing pulse generator. The composite synchronizing pulse signal output is shown at 15 and the equalizing pulse group gate signal output is shown at 16 as these signals are utilized in the present invention.

According to the invention, the composite synchronizing output 15 of the local synchronizing pulse generator 10 and a source 18 of remote composite synchronizing pulses are respectively applied through integrating networks 19 and 20 to a phase detecting means 21. The phase detecting means produces a first pulse signal of which the width of each pulse represents the phase difference between the local and remote vertical synchronizing pulses. Either output 1 or 2 from the phase detecting means 21, depending upon whether a lead or lag function is to be performed, and the predetermined frequency output 17 are applied to a first pulse generating means shown enclosed in dotted rectangle 22. The desired output from the phase detecting means 21 can be conveniently selected by means of any conventional electronic switch 21'. The first pulse generating means 22 produces a second pulse signal of which the width of each pulse represents the phase difference between the local and remote vertical synchronizing pulses when the phase difference therebetween is equal to or greater than one cycle of the pulse signal of predetermined frequency. When the phase difference between the local and the remote vertical synchronizing pulses is less than one cycle of the pulse signal of predetermined frequency, the width of each pulse of the second pulse signal produced by the pulse generating means 22 represents the constant phase difference between the first pulse signal and the pulse signal of predetermined frequency. The output from the first pulse generating means 22 and the predetermined frequency output 17 are applied to separate inputs of a coincidence gate means 23. The coincidence gate means 23 is responsive at its inputs to the coincidence of the second pulse signal and the pulse signal of predetermined frequency to produce at its output a third pulse signal comprising a series of pulses of said predetermined frequency. The output from the coincidence gate means 23 is applied to a second pulse generating means shown enclosed in dotted rectangle 24. The second pulse generating means 24 produces a series of pulses which when applied to the input of the frequency divider chain 12, alter the time of operation thereof during each vertical period at a variable rate, until the local and remote vertical synchronizing pulses have been locked into phase.

The phase detecting means 21 can be a conventional bistable multivibrator which is triggered on alternate sides by the integrated local and remote vertical synchronizing pulses to produce the first pulse signal representing the phase difference therebetween.

The first pulse generating means 22 comprises differentiating networks 25 and 26, a further phase detecting means 27 and an "OR" gate 28. The differentiating networks 25 and 26 are respectively fed from the output of phase detecting means 21 and the predetermined frequency output 17 to produce triggering pulses for actuating the phase detecting means 27. The phase detecting means 27 can be a conventional bistable multivibrator and produces a fourth pulse signal of which the width of each pulse represents the constant phase difference between the first pulse signal and the pulse signal of predetermined frequency. The outputs from the phase detecting means 21 and 27 are applied to separate inputs of an "OR" gate 28. The "OR" gate is responsive at its inputs to the presence of either the first or fourth pulse signal to produce at its output a pulse signal which is the second pulse signal referred to earlier.

The second pulse generating means 24 comprises a differentiating network 29, a pulse generator 30 and position 1 of an electronic switch 31 or the differentiating network 29, and position 2 of the switch 31 depending upon whether a lead or lag function is to be performed. When it is desired to retard the time of operation of the frequency divider chain 12, the trigger pulses from the differentiating network 29 are applied through position 1 of the switch 31 to the pulse generator 30 which produces a series of pulses of opposite polarity to the pulses produced by the master oscillator 11. The pulses from the pulse generator 30 are then applied to the input of the frequency divider chain 12. When it is desired to advance the time of operation of the frequency divider chain 12, the third pulse signal from the output of the coincidence gate means 23 is applied to the differentiating network 29 which produces a series of trigger pulses of the same polarity as the pulses produced by the master oscillator 11. These trigger pulses are applied through position 2 of the switch 31 to the input of the frequency divider chain 12.

FIGURES 2 and 3 show two types of well known electronic counter frequency divider chains 12 of FIGURE 1 with which the invention can be advantageously used.

FIGURE 2 shows a parallel fed type of frequency divider chain whereby the 31.5 kc. trigger pulses derived from the master oscillator 11 of FIGURE 1 are applied to the inputs of three frequency dividers 41, 42 and 43, which respectively divide by 3, 5 and 7. The outputs from each frequency divider is applied to separate inputs of a coincidence counter 44 which produces an output for each coincidence of the frequency dividers applied to its inputs. In other words, the coincidence counter 44 produces an output for every 105th pulse applied to its inputs and therefore, produces an output 17 consisting of pulses having a frequency of 300 c.p.s. The output from the coincidence counter 44 is applied to the input of a further frequency divider which divides by 5 to produce an output 14 consisting of pulses having a frequency of 60 c.p.s.

Each of these 60 c.p.s. pulses are of such a width as to be capable of overlapping one 300 c.p.s pulse appearing at the output 17. The 60 c.p.s. pulses are then used to gate every 5th 300 c.p.s. pulse in the other conventional circuits, block 13, of the synchronizing pulse generator 10 (FIGURE 1). The resulting 60 c.p.s. pulses are known as the vertical synchronizing pulse group gate which is used to gate 31.5 kc. pulses to form the vertical synchronizing pulses which are then combined with horizontal synchronizing pulses and equalizing pulses to appear at the composite synchronizing output 15 (FIGURE 1). It can be seen that if the 300 c.p.s. pulses appearing at output 17 have been altered in phase, then the vertical synchronizing pulses appearing at output 15 will correspondingly be altered in phase.

FIGURE 3 shows a cascade type of frequency divider chain whereby the 31.5 kc. trigger pulses derived from the master oscillator 11 of FIGURE 1 are applied to a series arrangement of frequency dividers 41, 42, 43 and 45. The 300 c.p.s. pulses are derived from the output of the frequency divider 43 and the 60 c.p.s. pulses are derived from the output of the frequency divider 45. The effect of altering the phase of the 300 c.p.s pulses appearing at output is the same as for the arrangement of FIGURE 2.

For a better understanding of the operation of the phase locking apparatus, reference is now made to the waveforms of FIGURES 4(*a*) and 4(*b*). Waveform A illustrates the series of positive trigger pulses derived from the master oscillator 11 to trigger the frequency divider chain 12. Waveform B illustrates the local vertical synchronizing pulses as they appear at the composite synchronizing output 15. In most synchronizing pulse generators, the first appearance of the vertical synchronizing pulses is adapted to coincide with the sixteenth trigger pulse derived from the master oscillator 11. Waveform C illustrates the source 18 of remote vertical synchronizing pulses received from a remote television station. By comparing waveforms B and C, it can be readily seen that the local and remote vertical synchronizing pulses are out of phase with each other.

Waveforms D and E respectively illustrate the pulses formed by the integrating networks 19 and 20 which are applied to the phase detecting means 21.

Waveforms F to N illustrate the operation of the apparatus when it is desired to retard the time of operation of the frequency divider chain 12. Waveform F illustrates output 1 from the phase detecting means 21 which constitutes the first pulse signal of which the width of each pulse represents the phase difference between the local and vertical synchronizing pulses.

Waveform G illustrates the 300 c.p.s. pulses appearing at the output 17 of the frequency divider chain 12. Waveforms H and I respectively illustrate the pulses formed by the differentiating networks 25 and 26 which are applied to the phase detecting means 27. Waveform J illustrates the output from the phase detecting means 27 which constitutes the fourth pulse signal of which the width of each pulse represents the constant phase difference between the first pulse signal and the 300 c.p.s. pulses. This phase detecting means 27 is included in the apparatus to ensure that regardless of how small the phase difference between the local and remote vertical synchronizing pulses is, at least one 300 c.p.s. pulse will be applied to the input of the frequency divider chain 12 as will be explained in more detail hereinafter.

The input from the phase detecting means 21 and 27 (waveforms F and J) are then applied to the inputs of the "OR" gate 28. An "OR" gate, as is well known in the art, will produce a pulse signal at its output whenever a pulse signal is applied to either of its inputs. For the amount of phase difference illustrated in FIGURE 4, the width of the pulses of waveform F is greater than the width of the pulses of waveform J. Therefore, the output from the "OR" gate 28 will be a series of pulses as illustrated in waveform K.

The output from the "OR" gate 28 (waveform K) and the 300 cycle pulses (waveform G) are then applied to separate inputs of the coincidence gate means 23. Waveform L illustrates the output from the coincidence gate means 23 which comprises a series of 300 c.p.s. pulses occurring for the duration of the pulses of waveform K.

The output from the coincidence gate means 23 (waveform L) is differentiated in differentiating network 29 to produce a series of trigger pulses as illustrated in waveform M.

Waveform M is applied to the pulse generator 30. The pulse generator 30 can be a conventional blocking oscillator and produces a series of 300 c.p.s. negative pulses as illustrated in waveform N, which are applied through position 1 of the switch 31 to the input of the frequency divider chain 12. By comparing waveforms A and N, it can be seen that the negative pulses of waveform N cancel out a number of positive trigger A derived from the master oscillator 11. This action retards the time of operation of the frequency divider chain 12 until the local and vertical synchronizing pulses have been locked into phase.

Waveforms O to T illustrate the operation of the apparatus when it is desired to advance the time of operation of the frequency divider chain 12. Waveform O illustrates output 2 from the phase detecting means 21. Waveforms P, Q, R, S and T respectively illustrate the pulses formed by differentiating network 25, phase detecting means 27, "OR" gate 28, coincidence gate means 23 and differentiating network 29. Waveform T is directly applied to the input of the frequency divider chain 12 through position 2 of the switch 31. Again, by comparing waveforms A and T, the positive going pulses of waveform T occur between the trigger pulses A derived from the master oscillator 11. These positive trigger pulses of waveform T, when applied to the inputs of the frequency divider chain 12, advance the time of operation thereof until the local and remote vertical synchronizing pulses have been locked into phase.

This invention has the desirable feature of being able to alter the time of operation of the frequency divider chain 12 at a variable rate. Supposing for example, that the local vertical synchronizing pulses were 360° out of phase with the remote vertical synchronizing pulses in a given 60 cycle period. Since the pulses of waveforms N or T are occurring at a rate of 300 cycles per second, there will then be 300÷60 or 5 pulses produced in a given 60 cycle period.

These five pulses quickly reduce the phase difference. In the next 60 cycle period 4 pulses might occur, and so on down to 3, 2 and then 1. As can be seen, the phase difference being reduced very quickly when the phase difference is large and more gradually when the phase difference is small. When the phase difference is less than one cycle of the 300 cycle per second pulses, the provision of the phase detecting means 27 ensures that as long as there is an output from the phase detecting means 21 there will always be one 300 cycle per second pulse formed in the waveforms N or T. In such an instance, the pulses of waveform J or Q would be of greater width than the pulses of waveform F or O and would always include one 300 cycle per second pulse.

An additional feature of the invention is that the pulses of waveform N can be adjusted in width by the pulse generator 30. This allows another means for varying the rate of phase lock because the wider the pulses of waveform N, the more trigger pulses of waveform A will be cancelled out.

As previously mentioned, this invention has particular advantages when used with the types of frequency divider chain shown in FIGURES 2 and 3. As is well known in the art, conventional frequency dividers of the electronic counter type require a first trigger pulse to start a counting cycle. Thereafter, the frequency divider continues to count at the triggering rate until a counting cycle is completed even when trigger pulses are not continued. For example, consider the operation of a conventional frequency divider that divides by 3 and is triggered by 31.5 k.c. pulses. When the first trigger pulse is applied to its input, the frequency divider starts its counting cycle, counts three pulses at the triggering rate and produces an output for the third pulse. In order for the frequency counter to start a new counting cycle, an additional trigger pulse must appear to start the count.

As illustrated in FIGURES 4(*a*), the negative pulses of waveform N have their leading edges coinciding with the trailing edges of the pulses of waveform L. Each pulse of waveform L overlaps every 105th pulse of waveform A. It is only at these 300 cycle or 105 pulse intervals that the inputs to all of the frequency dividers 41, 42 and 43 of FIGURES 2 and 3 are in their quiescent state or awaiting the arrival of a trigger pulse to start a new cycle. This occurs at the 105th pulse, for example, when all of the outputs of the frequency dividers are in coincidence. At the beginning of the 106th pulse all of the inputs of the frequency dividers wil be in readiness to receive a trigger pulse to start a new counting cycle. In the arrangement of FIGURE 2, all of the frequency dividers 41, 42 and 43 will be triggered in coincidence by the appearance of the next 31.5 k.c. trigger pulse. In the arrangement of FIGURE 3, the frequency divider 41 will be triggered by the appearance of the next 31.5 k.c. pulse, while the frequency dividers 42 and 43 will be respectively triggered by the next 10.5 k.c. and 2.1 k.c. pulses applied to their input. When the pulses of waveform N are applied at the beginning of the 106th trigger pulse, all of the frequency dividers will be prevented from beginning a new counting cycle for the duration of the pulse of waveform N. Similarly, as illustrated in FIGURE 4(*b*), the positive going trigger pulses of waveform T have their leading edges coinciding with the trailing edges of the pulses of waveform.

It is to be understood that it is not absolutely necessary to generate the pulses of waveform N so that their leading edges coincide with the trailing edges of the 300 c.p.s. pulses. A pulse signal could be generated which coincided with the 300 c.p.s. pulses providing that the pulses were wide enough to cancel out at least one additional 31.5 kc. pulse.

By observing the phase relation of the local vertical synchronizing pulses (waveform B) with respect to the remote vertical synchronizing pulses (waveform C), the lag or lead function of the apparatus as produced by waveforms N or T can be more readily understood. In the typical waveforms of FIGURES 4(*a*) and 4(*b*) it can be seen that a greater number of inhibit pulses (waveform N) than trigger pulses (waveform T) are required to complete the phase locking action.

Once the phase locking has been completed, it is important that noise pulses that may accompany the source of remote composite synchronizing pulses do not start an erroneous cycle of phase locking. For this purpose, additional circuitry has been provided and is shown in FIGURE 1, with reference to the waveforms of FIGURE 5. The source 18 of remote vertical synchronizing pulses is first integrated in an integrating network 32 and then applied to one input of a further coincidence gate means 33. The equalizing pulse group gate output 16 is applied to the other input of the coincidence gate means 33. The equalizing pulse group gate signal is normally used in a synchronizing pulse generator to gate the occurrence of equalizing pulses in the composite synchronizing waveform to a specific timed location in each vertical period. The width of each equalizing pulse group gate is 18 31.5 kc. pulses wide and includes the occurrence of the local vertical synchronizing pulses. The equalizing pulse group gate signal is illustrated in waveform $B^1$ of FIGURE 5. The use of the equalizing pulse group gate signal, according to the invention, is to pass remote vertical synchronizing pulses to the output of coincidence gate means 33 only when they occur within the pulse width of an equalizing pulse group gate. Therefore, coincidence gate means 33 will have an output only when the remote vertical synchronizing pulses are locked in phase or nearly locked in phase with the local vertical synchronizing pulses.

The output from the phase detecting means 21 is first differentiated in differentiating network 34 and then applied to one input of a bistable multivibrator 35. To the other input of multivibrator 35 is applied the output from coincidence gate means 33. Multivibrator 35 has two stable states and is triggered on opposite sides by the output from the phase detecting means 21 and the output from the coincidence gate means 33. When the local and remote vertical synchronizing pulses have been completely locked in phase, there will be no output from phase detecting means 21 and when the vertical synchronizing pulses are substantially out of phase there will be no output from the coincidence gate means to be applied to the multivibrator 35. The output from the multivibrator 35 is applied to one input of a conventional resistive adding network 36, the other input of the resistive adding network 36 being fed with the equalizing pulse group gate signal. The output from the resistive adding network 36 is then fed via a buffer amplifier 37 to an input of the phase detecting means 21.

Figure 5:
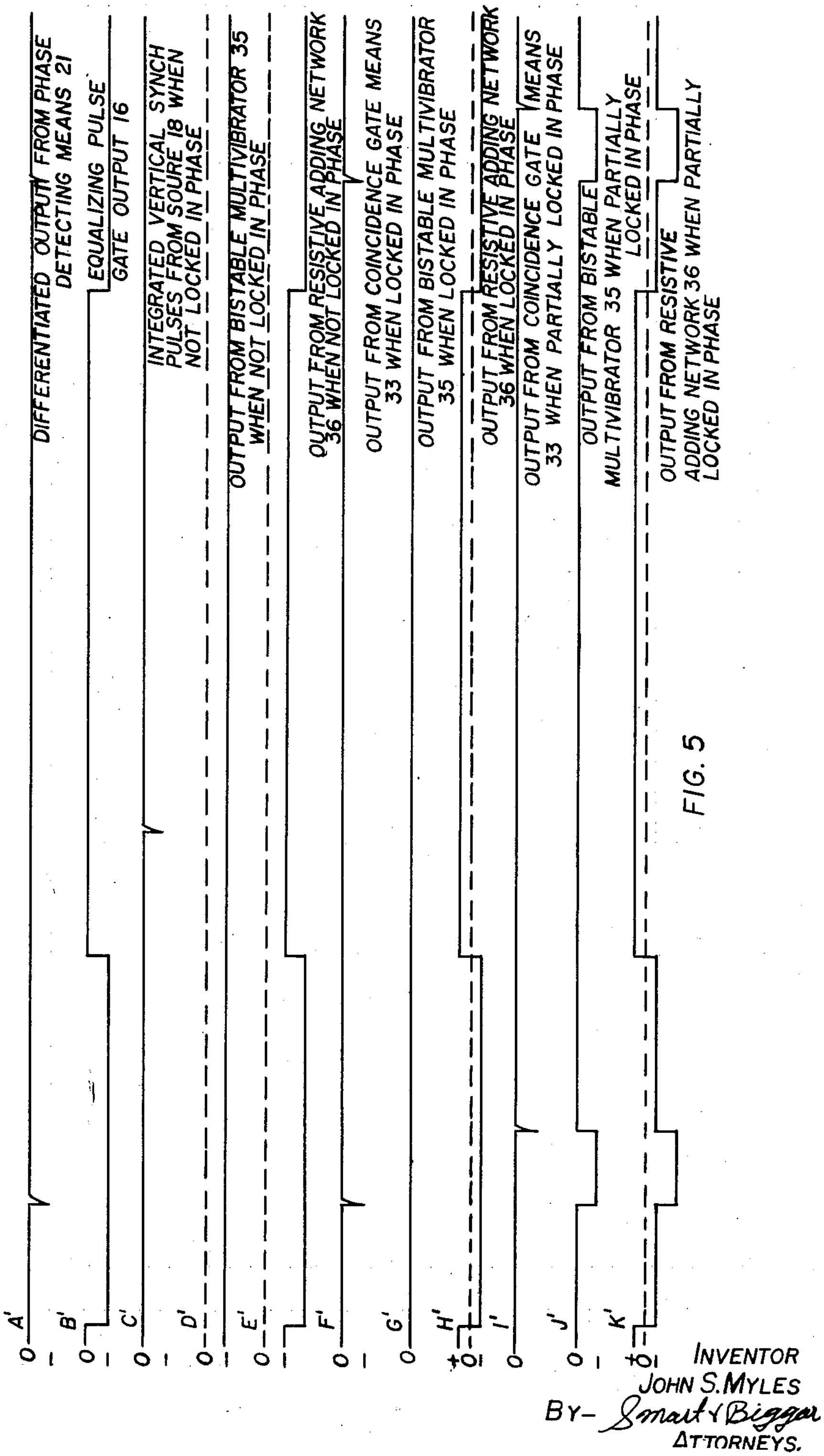

Referring now to the waveforms of FIGURE 5, waveform $A^1$ represents a typical differentiated output from the phase detecting means 21 when the local and vertical synchronizing pulses are out of phase. Waveform $B^1$ illustrates the equalizing pulse group gate signal derived from the local synchronizing pulse generator 10. Waveform $C^1$ represents integrated remote vertical synchronizing pulses when they are substantially out of phase with the local vertical synchronizing pulses. As can be seen from comparing waveforms $B^1$ and $C^1$, the pulses of waveform $C^1$ fall outside the pulses of waveform $B^1$. In such an instance, there will be no output from coincidence gate 33 and the multivibrator 35 will be triggered only on one side by waveform $A^1$. Thus, multivibrator 35 assumes its first stable state and the output therefrom is a constant negative voltage as illustrated in waveform $D^1$. The resistive adding network 36 will then add waveforms $B^1$ and $D^1$ to produce a negative output as illustrated in waveform $E^1$.

When the remote and local vertical synchronizing pulses are locked in phase, the output from coincidence gate 33 will be a series of pulses as illustrated in waveform $F^1$, since the remote vertical synchronizing pulses will fall within the equalizing group gate. However, as the local and remote vertical synchronizing pulses are in phase, there will be no output from the phase detecting means 21. Therefore, the multivibrator 33 will assume its second stable state which is a positive constant voltage as illustrated in waveform $G^1$. The output from the resistive adding network 36 in this instance will be as illustrated in waveform $H^1$.

When the local and remote vertical synchronzing pulses are partially locked in phase, that is, when the remote vertical synchronizing pulses fall within the equalizing group gate, the output from coincidence gate 33 will be as illustrated in waveform $I^1$. Waveforms $A^1$ and $I^1$ will then trigger multivibrator 33 to produce an output as illustrated in waveform $J^1$. In this instance, the output from the resistive adding network 36 will be as illustrated in waveform $K^1$. The resistive adding network for this application is adjusted in a manner well known to those skilled in the art to produce a negative output whenever one of its inputs is negative and to produce a positive output only when both of its inputs are positive.

Since the phase detecting means 21 is adapted to be triggered by negative going pulses, any negative going pulses applied to the phase detecting means 21 will merely act as a bias permitting the source of remote vertical synchrronizing pulses to trigger the phase detecting means 21. Upon examining waveform $E^1$, it can be readily seen that when the remote vertical synchronizing pulses are substantially out of phase with the local vertical synchronizing pulses, the remote vertical synchronizing pulses are always permitted to activate the phase detecing means. On the other hand, by examining waveforms $H^1$ and $K^1$, it can be readily seen that when the local and remote vertical synchronizing pulses are nearly in phase or are in phase, the phase detecting means 21 can only be activated during the interval in which equalizing pulse gate occurs. Any spurious pulses accompanying the source of remote vertical synchronizing pulses which lie outside the equalizing pulse group gate, will not be permitted to activate the phase detecting means 21.

Referring to FIGURE 6 for an understanding of how the lead or lag function is automatically selected, output 14 from the frequency divider 45 of FIGURE 2 or 3 (60 c.p.s. pulses in phase with the local vertical synchronizing pulses) is applied to a pulse stretching means 50. The pulse stretching means 50 preferably comprises two serially connected conventional pulse stretchers having a time constant such that the output of the second pulse stretcher is in plase with every 315th 31.5 k.c. trigger pulse derived from the master oscillator 11 of FIGURE 1. It is this pulse which determines whether a lead or lag function is to be performed. Although other pulses can be used, e.g. the 210th and 420th, the 315th pulse was found to be ideal because it occurs close to the mid-point between two successive cycles of the local vertical synchronizing pulses thereby permitting quick determined phase locking action.

The output from the pulse stretching means 50 and the 300 c.p.s. pulses from output 17 of FIGURE 1 are applied to separate inputs of a coincidence gate means 51. The 300 c.p.s. pulses which pass through the coincidence gate means 51 are the ones that coincide with every 315th 31.5 kc. pulse. These pulses are fed in parallel to two differentiating networks and diode clipping circuits 52 and 53 which produce negaitve and positive going trigger pulses respectively, These trigger pulses are respectively applied to one input of two coincidence gate means 54 and 55. Output 2 from the phase detecting means 21 is applied to the other input of the coincidence gate means 54 and 55.

By examining waveform O of FIGURE 4($b$), it can be seen that output 2 from the phase detecting means 21 is negative going when triggered by a remote vertical synchronizing pulse. If waveform O is negative going upon the occurrence of the 315th 31.5 kc. pulse, the local vertical synchronizing pulses are said to be leading the remote vertical synchronizing pulses. A series of negative going trigger pulses are formed at the output of the coincidence gate means 54 and coincidence gate means 55 is blocked. These trigger pulses control the lag function of the apparatus and last until the phase lock is complete.

Similarly, when waveform O is positive going upon the occurrence of the 315th 31.5 kc. pulse, the local vertical synchronizing pulses are said to be lagging the remote vertical synchronizing pulses. A series of positive going trigger pulses are formed at the output of the coincidence gate means 55 and coincidence gate means 54 is blocked. These trigger pulses control the lead function of the apparatus.

The outputs from coincidence gate means 54 and 55 are applied to separate inputs of a bistable multivibrator 56. Outputs 1 and 2 from the multivibrator 56 are respectively applied to one input of two coincidence gate means 57 and 58. Outputs 1 and 2 from the phase detecting means 21 are applied to the other input of the coincidence gate means 57 and 58. The outputs from the coincidence gate means 57 and 58 are applied to separate inputs of an "OR" gate means 59. The output from "OR" gate means 59 appears at terminal 60 and is the pulse signal applied to the input of "OR" gate 28 of FIGURE 1.

Output 1 from the multivibrator 56 is also applied to one input of two coincidence gate means 61 and 62. The output from the differentiating network 29 (FIGURE 1 and waveform T of FIGURE 4($b$)) is applied to the other input of the coincidence gate means 61 and the output from the pulse generator 30 FIGURE 1 and waveform N of FIGURE 4($a$)) is applied to the other input of the coincidence gate means 62. The outputs from gate means 61 and 62 appear at terminals 63 and 64 respectively. These outputs are applied to the input of the frequency divider chain 12 (FIGURE 1) and respectively represent the positive going trigger pulses for performing a lead function and the negative going inhibit pulses for performing a lag function.

The waveforms of FIGURE 7 illustrate the operation of the multivibrator 56, coincidence gate means 57, 58, 61 and 62 and "OR" gate means 59 for the lag and lead functions of the apparatus. It can be seen from these waveforms that the desired lag or lead selection is automatically accomplished.

All of the components of the block diagrams shown in the drawings are of basic, well known configurations, e.g. coincidence gate means, "OR" gate means, bistable multivibrators etc., which may be constructed in a variety of ways, diode gates, resistor transistor gates, etc.

What I claim as my invention is:

1. Apparatus for use at a local television station to lock the phase of vertical synchronizing pulses generated at the local station in synchronism with the phase of a source of vertical synchronizing pulses generated at a remote station, the local station having a local synchronizing pulse generator including a frequency divider chain actuated by a master oscillator to produce pulses of the local vertical synchronizing period, comprising phase detecting means responsive to a source of local vertical synchronizing pulses derived from the local synchronizing pulse generator and to a source of remote vertical synchronizing pulses to produce a first pulse signal of which the width of each pulse represents the phase difference between said sources of vertical synchronizing pulses, first pulse generating means responsive to said first pulse signal and to a pulse signal of predetermined frequency derived from said frequency divider chain to produce a second pulse signal of which the width of each pulse represents the phase difference between said sources of vertical synchronizing pulses when the phase difference between said sources of vertical synchronizing pulses is equal to or greater than one cycle of said pulse signal of predetermined frequency and of which the width of each pulse represents the constant phase difference between said first pulse signal and said pulse signal of predetermined frequency when the phase difference between said sources of vertical synchronizing pulses is less than one cycle of said pulse signal of predetermined frequency, coincidence gate means responsive at its inputs to the coincidence of said second pulse signal and said pulse signal of predetermined frequency to produce at its output a third pulse signal comprising a series of pulses of said predetermined frequency, and second pulse generating means responsive to the output of said coincidence gate means to produce a fourth pulse signal, said fourth pulse signal connected to the input of said frequency divider chain to alter the time of operation thereof during each vertical period at a variable rate until said sources of vertical synchronizing pulses have been locked into phase.

2. Apparatus as defined in claim 1 wherein said phase detecting means is a bistable multivibrator.

3. Apparatus as defined in claim 1 wherein said first pulse generating means comprises further phase detecting means and OR gate means, said further phase detecting means being responsive to said first pulse signal and to said pulse signal of predetermined frequency to produce a fifth pulse signal of which the width of each pulse represents the constant phase difference between said first pulse signal and said pulse of predetermined frequency, said OR gate means being responsive at its inputs to the appearance of either said first or fifth pulse signal to produce at its output a pulse signal having a pulse width equal to that of the longer of said first or fifth pulse signal.

4. Apparatus as defined in claim 3 wherein said further phase detecting means is a bistable multivibrator.

5. Apparatus as defined in claim 1 wherein said second pulse generating means comprises a differentiating network responsive to the output of said coincidence gate means to produce said fourth pulse signal at the trailing edge of each pulse of said third pulse signal, the pulses of said fourth pulse signal having the same polarity as the pulses produced by said master oscillator, said fourth pulse signal being applied to the input of said frequency divider chain to advance the time of operation thereof when said source of local vertical synchronizing pulses lags said source of remote vertical synchronizing pulses.

6. Apparatus as defined in claim 1 wherein said second pulse generating means comprises a differentiating network responsive to the output of said coincidence gate means to produce said fourth pulse signal at the trailing edge of each pulse of said third pulse signal, the pulses of said fourth pulse signal having the same polarity as the pulses produced by said master oscillator, and a coincidence pulse generator responsive to said fourth pulse signal to produce a series of pulses of opposite polarity to the pulses produced by said master oscilaltor, said pulses of opposite polarity being applied to the input of said frequency divider chain to retard the time of operation thereof when said source of local vertical synchronizing pulses lead said source of remote vertical synchronizing pulses.

7. Apparatus as defined in claim 6 wherein said coincidense pulse generator is a blocking oscillator.

8. Apparatus for use at a local television station to lock the phase of vertical synchronizing pulses generated at the local station in synchronism with the phase of a source of vertical synchronizing pulses generated at a remote station, comprising a local synchronizing pulse generator having a frequency divider chain actuated by a master oscillator to produce pulses of the local vertical synchronizing period, first phase detecting means responsive to a source of local vertical synchronizing pulses derived from the local synchronizing pulse generator and to a source of remote vertical synchronizing pulses to produce a pulse signal of which the width of each pulse represents the phase difference between said sources of vertical synchronizing pulses, second phase detecting means responsive to the output of said first phase detecting means and to a pulse signal of predetermined frequency derived from said frequency divider chain to produce a pulse signal of which the width of each pulse represents the constant phase difference between said pulse signal derived from said first phase detecting means and said pulse signal of predetermined frequency, OR gate means responsive at its inputs to the appearance of either of said pulse signals derived from said first or second phase detecting means to produce at its output a pulse signal having a pulse width equal to that of the longer of the pulse signals applied to its inputs, coincidence gate means responsive at its inputs to the output of said OR gate means and to said pulse signal of predetermined frequency to produce at its output a pulse signal comprising a series of pulses of said predetermined frequency occurring while the pulse signals applied to its inputs are in coincidence, and pulse generating means adapted to couple the output of said coincidence gate means to the input of said frequency divider chain to alter the time of operation thereof during each vertical period at a variable rate until said sources of vertical synchronizing pulses have been locked into phase.

9. Apparatus as defined in claim 8 wherein said frequency divider chain is of the parallel fed electronic counter type.

10. Apparatus as defined in claim 8 wherein said frequency divider chain is of the cascade electronic counter type.

11. Apparatus as defined in claim 1 comprising further coincidence gate means responsive at its inputs to the coincidence of said source of remote vertical synchronizing pulses and a predetermined gate pulse signal derived from the local synchronizing pulse generator, to produce at its output remote vertical synchronizing pulses, said predetermined gate pulse signal occurring during each local vertical synchronizing period, a bistable multivibrator responsive at its inputs to said first pulse signal from the output of said phase detecting means and said remote vertical synchronizing pulses from the output of said further coincidence gate means to produce at its output a sixth pulse signal, a resistive adding network responsive at its inputs to said sixth pulse signal and said predetermined gate pulse signal to produce at its output a seventh pulse signal which is applied to an input of the phase detecting means to prevent spurious signals accompanying the source of remote vertical synchronizing pulses from activating the phase detecting means once the local and remote vertical synchronizing pulses have been locked into phase.

References Cited in the file of this patent

UNITED STATES PATENTS

| | | |
|---|---|---|
| 2,704,307 | Gillette et al. | Mar. 15, 1955 |
| 2,720,555 | Krause | Oct. 11, 1955 |